Aug. 22, 1933.  A. M. GIFFORD ET AL  1,923,367

TRAILER HITCH

Filed March 7, 1932

INVENTORS
Arnold M. Gifford
Robert Smith
John A. Arrowsmith
ATTORNEY

Patented Aug. 22, 1933

1,923,367

UNITED STATES PATENT OFFICE 1,923,367

TRAILER HITCH

Arnold M. Gifford, San Jose, and Robert Smith, Bonnie Brae Station, Calif.

Application March 7, 1932. Serial No. 597,274

6 Claims. (Cl. 280—33.15)

Our invention relates particularly to trailer hitches of the type disclosed in our patent dated the fifteenth day of February, 1927, and bearing Patent No. 1,617,709.

It is one object of the present invention to provide a trailer hitch of the character indicated that will permit any required relative movement between the truck and trailer through the medium of a few simple, strong, and durable parts so assembled as to be positive in action under varying conditions.

It is another object to provide a device of the character indicated in which a simple, compact and efficient means is provided for locking the separable elements together when joined, the interlocking parts being so formed as to effectually prevent play therebetween.

Still another object is to provide a simple and efficient means for securing the part of the hitch mounted on the truck in an inoperative position when not in use.

It is also an object to provide a device of the character indicated whereby the coupling parts may be positively brought into alignment by operation of the pulling vehicle when the trailer pole does not swing freely.

Finally, it is an object of the invention to provide a hitch of the character indicated that will be economical to manufacture, of few parts, quickly and easily assembled, positive in action, strong, durable, and highly efficient in its practical application.

Figure 1:
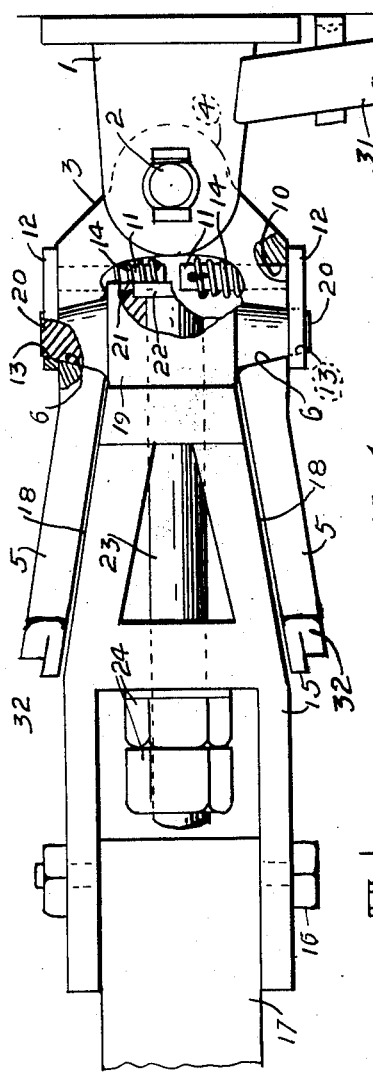
Figure 1 is a plan view of the device as assembled in an operative position.
Figure 3:
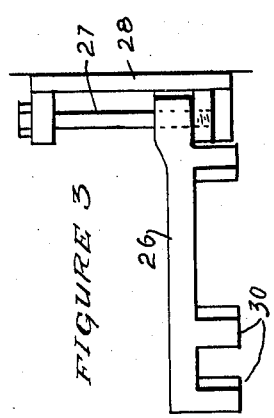
Figure 3 is a detail side elevation of the latch for holding the trailer hitch element in an inoperative position.
Figure 2:
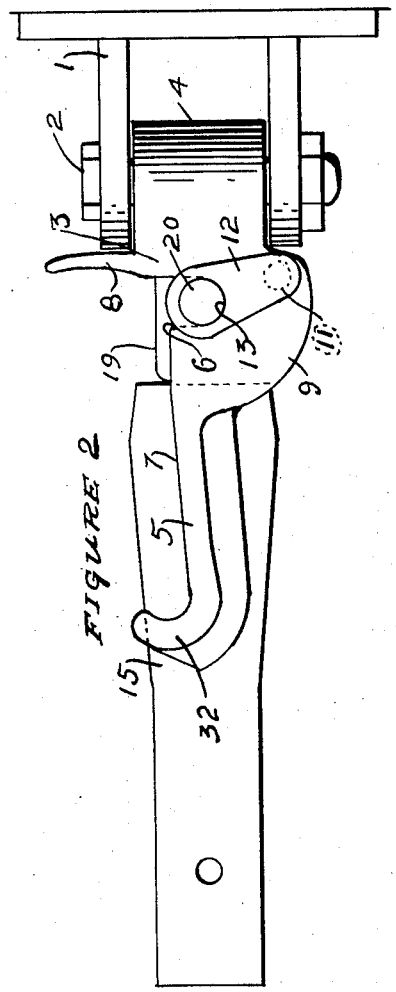
Figure 2 is a side elevation of the same.

In the embodiment of the invention as herein disclosed we show at 1 a bearing member which is designed to be rigidly mounted upon a truck body, and in which is mounted a vertically disposed king pin 2.

Mounted upon pin 2 to swing in a horizontal plane about the same is a coupler element or finder 3.

The head 4 of finder 3 encompasses pin 2 and is provided with a pair of diverging arms 5 directed outwardly from head 4 and symmetrically disposed on opposite sides of a vertical plane bisecting head 4 and pin 2.

Each arm 5 has a socket as 6 formed transversely therein adjacent head 4, the two sockets being axially aligned and tapering from their inner ends outwardly as shown.

The upper surface of each arm is inclined downwardly and outwardly from the socket therein as shown at 7, the point of beginning of the said surface being somewhat lower than the top of head 4 to form a shoulder which is provided with an upwardly projecting finger as 8.

Directly below each socket 6 the arm widens out into a flange 9 having a bearing 10 formed therein to receive an inwardly projecting pin 11. Upon pin 11 is mounted a keeper plate 12 provided with a hole 13 adapted to be swung into alignment with the adjacent socket 6 at the outer end thereof.

The plate 12 is seated against flange 9 by means of a spring 14 on its inwardly projecting end and bearing against the inner side of said flange.

The complementary portion of the trailer hitch comprises a yoke 15 which is mounted in any suitable manner, as at 16, to the tongue 17 of the trailer.

The forward end of the yoke tapers on its sides as at 18 to correspond to the divergent angle of arms 5.

At 19 is a tongue head proportioned to pass freely into the space between the inner ends of arms 5 and immediately forward of head 4.

The head 19 has laterally extending tapered bosses 20 formed thereon in axial alignment and adapted to seat snugly in sockets 6 and projecting a little beyond the same as shown.

In the forward end of head 19 is formed a recess 21 in which is seated the head 22 of a tongue bolt 23, said bolt passing through the head and through yoke 15, and fitted with nuts at 24 through the medium of which the pulling forces acting upon the bolt are transmitted to the yoke.

The two arms 5 are provided with upwardly turned hooklike fingers as 32 on their free ends.

By means of the construction described the tongue head 19 may rotate about the longitudinal axis of the yoke 15, but upon entering the space between arms 5 of the keeper element the bosses 20 engage the upper surfaces of said arms and are automatically guided to their seats in sockets 6.

This accurate and positive seating of the tongue head 19 is assured at all times because the finder 3 is so mounted and shaped that the moment the tongue head enters between arms 5 it moves into correct alignment therewith and an accurate coupling is effected, even though the truck and the trailer are out of alignment.

When the desired coupling has been effected the parts are securely held against accidental displacement by swinging the keeper plates 12 into position. By pulling the plates outwardly against the tension of springs 14 they may be dropped over the ends of the bosses 20, thereby effectually preventing displacement of the head 19 until released by the removal of the keeper plates therefrom.

It is a common occurrence, in actual practice, to have the trailer tongue so positioned with reference to the truck, that by merely backing the truck to the trailer tongue the parts will not automatically swing into alignment. For instance, in a "fifth wheel" trailer construction the resistance to the swinging of the tongue, especially with a load on the trailer, is so great that other means must be used to straighten the tongue out before the hitching operation can take place. By providing hooks as 32 on the outer ends of the arms 5 the truck may be backed up until the hooks 32 engage the bosses 20, and then driven forward again, thereby pulling the tongue out into the position desired whereupon the bosses may be properly seated in sockets 6 by again backing the truck relative to the trailer.

The upstanding finger 8, of course, functions as a stop for the trailer pole parts if the bosses 20 fail to engage the sockets 6 in the hitching operation and ride up over the same, an operation that might cause considerable damage to the truck.

When the coupling elements are not in use the part 3 may be swung into the position shown in dotted lines at 25 and held against movement relative to the truck by a latch bar 26 pivotally mounted on a pin 27 mounted in a bearing member 28 on the truck body. The latch may be swung outwardly as indicated in dotted lines at 29 and the fingers 30 allowed to drop over arms 5, thereby holding the coupling member against movement.

When the latch 26 is not in use it is held in a fixed position by a restraining catch 31 mounted on the truck body.

It is to be understood, of course, that while we have herein shown and described but one specific embodiment of the invention, changes in form, construction, and method of assembly and operation may be made within the scope of the appended claims.

We claim:

1. A trailer hitch comprising, a coupling part mounted to swing laterally and having diverging arms provided with seats to receive another coupling part, said arms having means mounted thereon adapted to engage the other coupling element when engaged therein, said means being mounted for rotational movement in planes parallel with the planes of the arms and also resiliently mounted for lateral movement.

2. A trailer hitch of the character described comprising, a coupling part mounted to swing laterally and having diverging arms having seats formed therein, said seats tapering from the inner to the outer sides of the arms, and a cooperating coupling part having a head adapted to pass between the said arms and having laterally projecting and outwardly tapering parts formed thereon adapted to engage said seats, and means mounted on the first coupling part movable into engagement with said tapering parts to hold them in said seats.

3. A trailer hitch comprising a coupling part mounted to swing laterally and including diverging sides formed with seats and grappling means, and a cooperating coupling part movable between the sides and provided with a cross coupling pin engageable with the seats or the grappling means.

4. A trailer hitch comprising, a coupling part mounted to swing laterally and having diverging arms having seats formed therein, and a cooperating coupling part having a tapering portion adapted to enter between said diverging arms, a head member mounted on the end of the tapering portion for rotational movement about the longitudinal axis of said cooperating coupling part, means for securing the head member against displacement, and means disposed on the head member adapted to engage the seats in the arms of the first mentioned coupling part.

5. A trailer hitch comprising a coupling part mounted to swing laterally and including a pivotal portion having diverging arms extending outwardly therefrom and having seats formed therein adjacent the pivotal portion and grappling means formed thereon at the ends remote from said seats, and a cooperating coupling part movable between the arms and provided with means for engaging said seats or said grappling means.

6. A trailer hitch comprising a coupling part mounted for a free lateral swinging movement and having seats formed therein and grappling means formed thereon, and a cooperating coupling part mounted for rotational movement about its longer axis and provided with coupling means engageable with said seats or grappling means of the first mentioned coupling part.

ARNOLD M. GIFFORD.
ROBERT SMITH.